United States Patent

Walker

[15] 3,680,003

[45] July 25, 1972

[54] MULTIVIBRATOR CIRCUITS EMPLOYING OR-NOR GATES

[72] Inventor: Maurice Mark Walker, Beaverton, Oreg.

[73] Assignee: Tektronix, Inc., Beaverton, Oreg.

[22] Filed: Feb. 27, 1970

[21] Appl. No.: 14,922

[52] U.S. Cl. ..........................331/108 D, 307/273, 331/111

[51] Int. Cl. ..........................H03k 3/282

[58] Field of Search ..................331/111, 108, 113; 307/143, 307/273, 290, 218, 259

[56] References Cited

UNITED STATES PATENTS

| | | | |
|---|---|---|---|
| 3,512,106 | 5/1970 | Rosenthal | 331/111 |
| 3,396,282 | 8/1968 | Sheng et al. | 307/273 |
| 3,443,246 | 5/1969 | Brown et al. | 331/173 |

OTHER PUBLICATIONS

R. E. Gordon, National Bur. of Standards, Tech. Note No. 437, Nov., 1967 pgs. 331- 143

*Primary Examiner*—John Kominski
*Attorney*—Buckhorn, Blore, Klarquist and Sparkman

[57] ABSTRACT

An astable or a monostable multivibrator includes a single stage, integrated circuit, "or-nor" gate, and timing circuitry intercoupling one or more gate outputs with the gate input. In the case of a monostable multivibrator, a timing capacitor couples the "or" output to the gate input, and a current source provides capacitor charging current to the timing capacitor. In the instance of the astable multivibrator, a timing capacitor also couples the gate's "or" output to the gate input, while a charging resistor is disposed between the gate's "nor" output and the gate input. An additional gate may be employed in conjunction with the astable multivibrator for selectively enabling and disabling operation thereof.

13 Claims, 4 Drawing Figures

PATENTED JUL 25 1972

3,680,003

MAURICE M. WALKER
*INVENTOR*

*BY*

*BUCKHORN, BLORE, KLARQUIST & SPARKMAN*
*ATTORNEYS*

MULTIVIBRATOR CIRCUITS EMPLOYING OR-NOR GATES

BACKGROUND OF THE INVENTION

Multivibrator circuits are advantageously constructed employing logic gates as sub-circuits, particularly in instances where similar sub-circuit modules are utilized for other purposes in the same overall system. The various inputs and outputs are then compatible and the units are suitably powered from the same supply voltages. As an additional advantage, the similar circuits will react in the same way to temperature changes and the like. Moreover, integrated circuit gates are commercially available which consume minimum space and which can be installed with a minimum of additional wiring.

Conventional gate circuit multivibrators each employ at least two gates which are then cross-connected in a well known fashion to form a multivibrator. Thus, an output from each gate is cross-connected to an input of the opposite gate, and a timing capacitor is included in at least one cross-connection. While construction of multivibrators from gate circuits in this manner leads to advantages of convenience, compatibility, etc., the resulting multivibrators have not achieved state of the art operating speeds even though the gates themselves are capable of rapid switching. If fast multivibrator operation is desired, high speed circuits employing discrete components are required or non-standard integrated circuits or the like must be specially constructed since such devices are not generally available.

SUMMARY OF THE INVENTION

In accordance with the present invention, a multivibrator comprises only a single gate having a timing circuit disposed between an output thereof and an input thereof, and no additional connection is made to the gate's internal wiring. In the instance of an astable multivibrator, resistive and reactive components couple inverted and non-inverted gate outputs to the gate input. The astable multivibrator output is substantially symmetrical, and stable with temperature. An additional gate may be employed for synchronously enabling and disabling the astable circuit. In the case of a monostable multivibrator, a reactive component couples a gate output to a gate input, while supply and input sources are also coupled to the gate input.

A multivibrator circuit utilizing one gate is not only more economical than circuits employing a plurality of gates, but is also faster in operation since the delay of only one gate is involved instead of the delay of two or more. The gates utilized are preferably single stage, integrated circuit "or-nor" gates employing emitter-coupled, transistor logic. Delay is minimized within such a stage, and therefore a multivibrator comprising but one such stage exhibits a further enhanced operating speed. Thus, state of the art multivibrator operating speeds are achieved according to the present invention with commercially available integrated circuit gates. For example, a repetition rate in an astable multivibrator of 250 megahertz is possible with available gates.

It is accordingly an object of the present invention to provide improved multivibrator circuitry employing standard integrated circuit gate devices.

It is another object of the present invention to provide an improved multivibrator comprising conventional gate circuitry and which is characterized by increased operating speed.

It is a further object of the present invention to provide a multivibrator constructed from readily available semiconductor integrated gate circuitry, which operates with optimum speed characteristic of multivibrators utilizing more conventional components.

It is another object of the present invention to provide an improved multivibrator comprising conventional gate circuitry and which is more economical with regard to initial cost of components as well as with respect to cost of interconnection thereof when compared with conventional gate circuit multivibrators.

It is a further object of the present invention to provide an improved astable multivibrator employing a single gate circuit, wherein a substantially symmetrical and temperature stable output is produced.

It is a further object of the present invention to provide an improved astable multivibrator and means for synchronously enabling and disabling said multivibrator, wherein said multivibrator and said disabling-enabling means respectively comprise single gate circuits.

It is a further object of the present invention to provide an improved monostable multivibrator constructed from a standard gate circuit and which is responsive to an input pulse applied at an input of said gate circuit for operating said monostable multivibrator.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
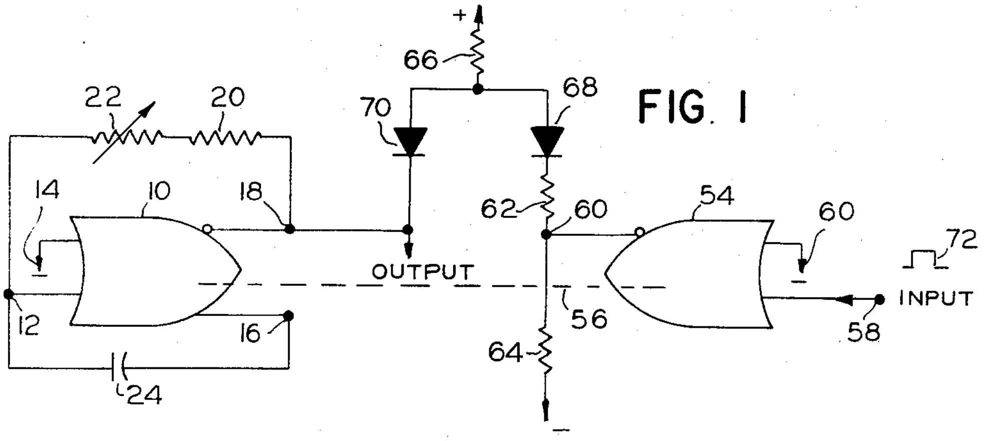
FIG. 1 is a schematic and block diagram of an astable multivibrator according to the present invention, together with a disabling-enabling circuit therefor.

Referring to the drawings, and particularly to FIG. 1, an astable multivibrator according to the present invention comprises an "or-nor" gate 10 having input terminals 12 and 14 as well as output terminals 16 and 18. The output provided at terminal 16 is an "or" or non-inverted output relative to the input provided at terminal 12, while the output provided at terminal 18 is an inverted or "nor" output. In this instance, input terminal 14 is connected to a reference voltage whereby the input applied at terminal 12 alone functions to operate the gate. Resistor 20 and variable resistor 22 are disposed in series between output terminal 18 and input terminal 12. Timing capacitor 24 couples output terminal 16 to input terminal 12.

Briefly, the astable multivibrator thus far described operates to provide a series of pulses at a repetition rate set by the time constant of capacitor 24 and resistors 20 and 22. The output can be substantially symmetrical wherein a relatively positive output is produced alternatively at terminals 16 and 18 for substantially similar periods of time. Let us assume that output terminal 16 has just gone positive in response to a positive signal exceeding a predetermined level at input terminal 12. This time is indicated at $t_1$ in FIG. 3, on the waveform representing the voltage at terminal 12. Since the voltage across capacitor 24 cannot change immediately, the positive excursion thereof at time $t_1$ is applied to terminal 12. Capacitor 24 provides positive feedback action for enhancing fast switching. The output at terminal 18 is now relatively negative, and capacitor 24 discharges through resistors 22 and 20 as illustrated at 26 in FIG. 3. When a predetermined level is reached by the discharge of capacitor 24, gate 10 starts changing states such that the output at terminal 18 tends to become relatively positive, and the output at terminal 16 tends to become relatively negative. When the output at terminal 16 drops in voltage, this voltage change is transmitted to terminal 12, enhancing fast switching. Thus, as the voltage at terminal 12 starts to drop below said predetermined level, the gate causes terminal 12 to become more negative, which in turn causes a continued drop at terminal 12 through capacitor 24 resulting in rapid switching. The voltage levels at terminals 16 and 18 are interchanged at time $t_2$. Now, however, capacitor 24 charges through resistors 22 and 20 to the relatively positive level of terminal 18, as indicated at 28 in FIG. 3. When capacitor 24 charges sufficiently so that terminal 12 reaches a predetermined level, the gate again changes state, with this occurring at time $t_3$. The conditions at time $t_3$ are identical to those at time $t_1$, and the cycle repeats. It will be observed that operation is substantially symmetrical. Operation is also found to be stable with temperature.

In the FIG. 1 circuit, variable resistor 22 is employed to alter the time constant of the circuit further including resistors 20 and 22. Therefore adjustment of resistor 22 changes the discharging and charging rate depicted at 26 and 28 in FIG. 3. Accordingly, adjustment of resistor 22 adjusts or selects the period of the multivibrator output, or the repetition rate or frequency thereof.

Although a conventional "or-nor" gate is not generally thought of as having amplification, such will generally be the case. This is particularly true for circuits exhibiting high immunity to noise. Thus, a relatively small change is necessary at input terminal 12 to shift operation of the gate between the two states thereof. The gate may be considered as providing an input "window," between voltage values 30 and 32 in FIG. 3, such that an input above value 32 causes the gate to reside in one state, i.e. producing a relatively positive output at terminal 16, while an input below voltage value 30 causes the gate to reside in a second state, providing a relatively positive output at terminal 18. Thus, a relatively small change in input produces a relatively large change in the gate output. Amplification is advantageous for any gate circuit which is designed to provide input drive for subsequent gates of a generally similar type. Then, minor variations in voltage between the output of one gate and the input of a succeeding gate will have little effect upon the operation of logic circuitry and one gate can quickly switch a following gate.

The output at terminal 18 switches from a level well above the input "window" in one switching state of the gate to a second level below the input "window" in a second state of the gate. This property is utilized in the astable multivibrator according to the present invention since the output at terminal 18 is employed to successively to charge and discharge capacitor 24 past the input "window" defined between voltage values 30 and 32.

It is convenient to speak of the aforementioned "window" as a voltage level, and it is so designated in the claims at the end of this specification. However, it is understood that such level generally comprises a range which will vary according to the particular gate employed. Also, while gates are spoken of as switching from one condition or state to another, it is not meant to imply that it is common or necessary for a gate to latch itself in one state or another. The gate merely produces an output at a given terminal which desirably resides at one of two values in accordance with the level of an input applied to the gate.

Figure 2:
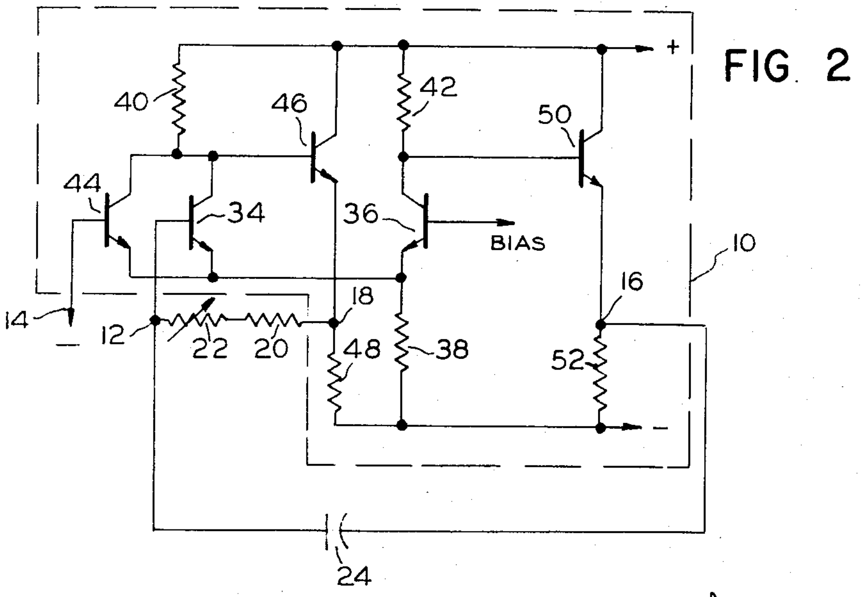
FIG. 2 is a schematic diagram of an astable multivibrator according to the present invention.

FIG. 2 illustrates the typical internal circuitry for gate 10, although it is understood the present invention is not restricted thereto in its broader aspects. The circuit illustrated in FIG. 2 comprises an emitter-coupled transistor stage, which has the advantage of minimum operational delay in producing inverted and non-inverted outputs. This type of circuit is characterized in the art as an emitter-coupled logic circuit. The stage comprises transistors 34 and 36 having their emitters connected together and returned to a common negative voltage point through resistor 38. Input terminal 12 is connected to the base of transistor 34, while the base of transistor 36 is connected to a bias potential substantially equal to the level which the input at terminal 12 must cross in order to switch the gate from one state to the other. Resistors 40 and 42 respectively couple the collectors of transistors 34 and 36 to a positive voltage point. An additional transistor 44, having its collector and emitter connected respectively to the collector and emitter of transistor 34, has its base connected to input terminal 14. This transistor provides an additional input to the gate, but is unused in the present example, terminal 14 being returned to a negative voltage level.

The collector of transistor 34 is also connected to the base of emitter-follower transistor 46, the collector of which is tied to a positive voltage and the emitter of which is connected to "nor" output terminal 18. An emitter resistor 48 returns the emitter of transistor 46 to a negative voltage point. Similarly, the collector of transistor 36 is connected to the base of an emitter-follower transistor 50 having its collector connected to a positive voltage point and its emitter coupled to "or" output terminal 16. An emitter resistor 52 returns the emitter of transistor 50 to a negative voltage point.

Figures 3, 4:
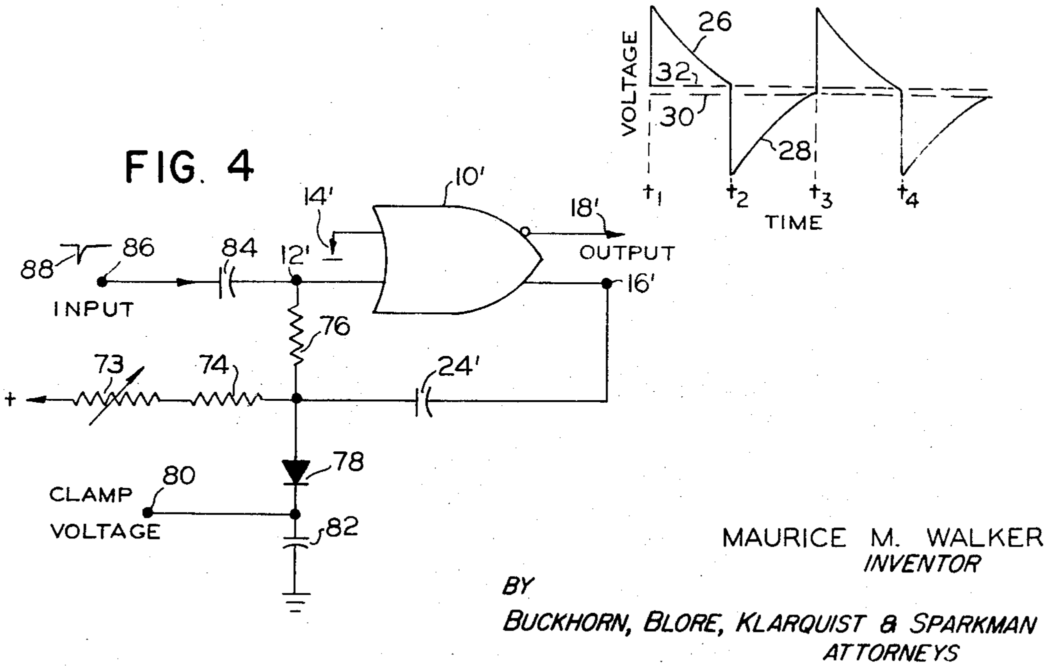
FIG. 3 is a waveform chart depicting timing circuit voltage in the FIG. 1 and FIG. 2 circuits.
FIG. 4 is a schematic and block diagram of a monostable multivibrator circuit according to the present invention.

Considering operation of the FIG. 2 circuit, when a relatively positive voltage appears at terminal 16, this voltage is immediately coupled to terminal 12 at time $t_1$ in FIG. 3, via capacitor 24. The base of transistor 34, connected to terminal 12, is then well above the bias level connected to the base of transistor 36, such that transistor 34 conducts and draws current through resistors 38 and 40. The voltage drop across resistor 38 turns off transistor 36 at its emitter, while the voltage drop across resistor 40 lowers the voltage at the base of transistor 46 and causes the emitter of transistor 46 to lower the voltage level at terminal 18 to a relatively negative value. Capacitor 24 discharges through resistors 22 and 20 along curve 26 as illustrated in FIG. 3. At the same time, transistor 36 is turned off and the voltage at the collector thereof is relatively high. This collector voltage causes emitter-follower transistor 50 to maintain the relatively positive level of output at terminal 16, corresponding to the first state of the gate circuit.

When capacitor 24 discharges past the level of the bias voltage supplied to the base of transistor 36, transistor 34 tends to cease conduction whereby the voltage drops at the emitter thereof. Transistor 36 starts conduction, and applies a relatively negative-going excursion on its collector to the base of transistor 50. The voltage at terminal 16 drops at time $t_2$. When the voltage at terminal 16 drops, this change is coupled by means of capacitor 24 to terminal 12, carrying terminal 12 well below the level for maintaining terminal 16 in a relatively negative condition. Meanwhile, transistor 34 has ceased conduction, and the voltage at the collector thereof rises, this rise being supplied through emitter-follower transistor 46 to terminal 18. Since the voltage at output terminal 18 is now relatively positive, capacitor 24 charges through resistors 22 and 20 as illustrated at 28 in FIG. 3. Operation proceeds as described in connection with FIG. 1 whereby the circuit reverts to the original conditions when the charge on capacitor 24 reaches the level of bias on transistor 36.

Gate 10 is desirably of the integrated circuit type, here employing NPN transistor configurations. The only external components required comprise the timing circuitry including capacitor 24 and resistors 20 and 22. No connection is required to the gate other than at the usual terminals provided on the commercially procured integrated circuit.

The astable multivibrator is found to be capable of rapid repetition rates up to 250 megahertz since a minimum of delay is occasioned in multivibrator operation. Delay is minimized since only one gate is involved and because the emitter coupling between transistors 34 and 36 speeds operation within the single gate circuit. In addition the enhanced speed of multivibrator operation procurable employing commercially available gate circuits, the resulting multivibrator is also, of course, more economical since fewer components are involved.

Returning to FIG. 1, a disabling-enabling circuit for the astable multivibrator is also illustrated. This circuit suitably comprises a second gate 54 which may be substantially identical to gate 10. It is further convenient that gate 54 be provided on the same semiconductor chip, as part of a dual integrated circuit gate together with gate 10. The unitary integrated circuit construction of gates 10 and 54 is indicated by dashed line 56 in FIG. 1. Gate 54 has first and second input terminals, 58 and 60, the latter being connected to a negative potential whereby the gate operation is entirely governed by the input applied at terminal 58. Gate 54 is suitably an "or-nor" gate, and the "nor" output is provided at terminal 60. The "or" output is not utilized in this particular instance.

Output terminal 60 of gate 54 is connected at a tap between resistors 62 and 64 of a voltage divider comprising resistor 66, diode 68, resistor 62, and resistor 64 disposed serially in that order between a positive voltage point and a negative voltage point. Doide 68 is poled such that the voltage divider carries current, i.e. the anode of diode 68 is connected to resistor 66. The anode of diode 70 is connected to a second tap on the voltage divider between resistor 66 and diode 68, while the cathode of diode 70 is connected to "nor" output terminal 18 of gate 10.

The input applied to gate 54 comprises a disabling-enabling input 72, wherein the relatively negative level of input 72 causes gate 54 to reside in a state such that terminal 60 produces a relatively positive output. As will be seen hereinafter, this relatively positive output disables operation of the astable multivibrator. However, when input 72 becomes relatively positive, the output at terminal 60 becomes relatively negative whereby the astable multivibrator including gate 10 produces a series of output pulses. A "burst" of output pulses is produced so long as input 72 remains relatively positive.

Considering operation of the complete FIG. 1 circuit in greater detail, let us assume that input terminal 58 of gate 54 is relatively negative, and output terminal 60 is relatively positive. Under these conditions, the division of voltage along voltage divider 66, 68, 62, 64 is such that the voltage at the tap between components 66 and 68 is at least as high or higher than the normal maximum voltage appearing at terminal 18 during normal astable multivibrator operation. Thus, for the condition described for gate 54, output terminal 18 of gate 10 is held at or above its usual relatively positive output level, and gate 10 is thereby held in a state wherein both outputs at terminals 16 and 18 are relatively positive. The resistors 20 and 22 hold terminal 12 at a relatively positive level, and no current flows from or into capacitor 24 quiescently. Then, when input 72 becomes relatively positive for enabling operation of the circuit, terminal 60 drops in potential causing the voltage at the junction between components 66 and 68 to drop whereby diode 70 is disconnected. Therefore, the astable multivibrator is free to operate in the previously described manner.

According to a preferred form of the present invention, gate 54, when in a disabling mode, maintains the voltage at terminal 18 well above the voltage which would appear at terminal 18 during regular astable multivibrator operation. The voltage at terminal 18 is preferably arranged to be greater than the usual voltage level encountered at the same terminal by the value of voltage which would remain on capacitor 24 at the exact time the astable circuit is ready to switch, during normal operation. Then, when input 72 goes positive, and terminal 18 is released by the disabling-enabling circuit, terminal 18 immediately becomes relatively negative. The capacitor 24 discharges through resistors 22 and 20 toward the relatively negative voltage at terminal 18, executing a full "half-cycle" of operation for the circuit. The circuit operates synchronously and delivers a chain of pulses starting almost immediately, these pulses being uniformly timed. The chain of output pulses may be started and stopped by the disabling-enabling circuitry with a minimum of interference with the desired waveform thereof.

When the input 72 becomes relatively negative again, the output at terminal 60 becomes relatively positive, raising the voltage at the junction between components 66 and 68. The voltage at terminal 18 is then again effectively clamped to such high voltage through diode 70. The output at terminal 16 will then switch to its high value if it is not already in that condition, due to resistive feedback through resistors 20 and 22 from terminal 18 to terminal 12. This concludes the burst of pulses provided at output terminal 18.

In the FIG. 1 circuit, resistor 66 supplies enough current to hold output terminal 18 of gate 10 high as well as to supply necessary current through resistor 62. The drop across resistor 62 equals the differential of voltage by which terminal 18 exceeds its regular voltage when disabled, i.e., the same as the value of the highest voltage present across capacitor 24. Resistor 64 insures that when the disabling-enabling circuit output drops, it pulls the voltage level at the junction of resistor 66 and diode 68 down with it. Diode 68 compensates for the presence of diode 70 with respect to temperature changes.

While gate 54 is suitably an "or-nor" gate of the same type as gate 10, it is understood another type of gate may be employed, for example, an "or" gate with appropriate changes in the polarity of input 72.

A monostable multivibrator according to the present invention is illustrated in FIG. 4. In FIG. 4, similar elements are designated by primed reference numerals. In the FIG. 4 circuit, a current source comprising resistors 73 and 74 in series tied to a positive voltage provides the charging means for capacitor 24', instead of feedback resistors from "nor" output terminal 18 as in the FIG. 1 circuit. Gate 10' is suitably of the same general type as gate 10, e.g., comprising an emitter-coupled logic stage as illustrated in FIG. 2, and having the same advantage of speed of operation and fast response. However, the circuit need not have both "or" and "nor" outputs, but rather only an "or" output is necessary. Thus the gate may comprise a single non-inverting gate, with the output for subsequent circuitry being taken from output terminal 16' instead of terminal 18' as shown on the drawing.

The FIG. 4 circuit additionally includes an isolating resistor 76 disposed between capacitor 24' and input terminal 12'. Also, a clamping means comprising clamping diode 78 has its anode connected to the junction between resistor 76 and capacitor 24' while its cathode is connected to a clamp voltage at terminal 80. A filter capacitor 82 returns the clamp voltage terminal to ground. The voltage at the junction of resistors 74 and 76 is held by the clamp voltage at a level less positive than the voltage to which resistor 73 is connected, this level suitably being just above the level of gate input at terminal 12' which will switch gate 10' to a state producing a relatively positive output at terminal 16' and a relatively negative output at terminal 18'. The diode 78 then functions to prevent timing capacitor 24' from charging up to the value to which resistor 72 is connected.

In addition, means for coupling input triggering pulses, such means here comprising capacitor 84, is disposed between circuit input terminal 86 and gate input terminal 12'. A negative-going triggering pulse 88 is suitably applied at circuit input terminal 86 in order to switch the monostable multivibrator from its quiescent stable state to its unstable state. Resistor 76 isolates the input from the low impedance diode clamp circuit, permitting easier triggering of the circuit by negative going pulse 88. clamp In the normal quiescent condition of the FIG. 4 circuit, a relatively positive output is produced at terminal 16', and a relatively negative output is produced at terminal 18'. The clamp diode 78 holds the left-hand side of capacitor 24' at a level just above the input level at terminal 12' at which switching takes place. Resistor 76 couples substantially the same voltage level to gate input terminal 12'. Thus, the voltage at terminal 12' is maintained at a value which insures a state of gate 10' such that the output at terminal 16' continues to be relatively positive, while the output at terminal 18' continues to be relatively negative.

Now, when a negative triggering pulse 88 is received, the same is coupled by capacitor 84 to gate input terminal 12', and such negative triggering pulse appears substantially across resistor 76. As a result, terminal 12' is driven below the predetermined input level at which the gate 10' changes states, and consequently a relatively negative output now occurs at terminal 16' with a relatively positive output appearing at terminal 18'. Since the voltage across capacitor 24' cannot change immediately, the relatively negative output at terminal 16′ is applied to the junction between resistor 76 and capacitor 24′ for holding the gate 10′ in the state for temporarily continuing the relatively negative output at terminal 16′. Capacitor 24′ now charges up by means of current supplied through resistors 73 and 74 toward the clamp voltage. Just before the junction of resistor 76 and capacitor 24′ reaches the clamp voltage, the predetermined input level at which switching takes place is exceeded, and gate 10′ switches to its original quiescent state wherein the output at terminal 16′ is relatively positive and the output at terminal 18′ is relatively negative. Assuming the triggering signal is no longer effective, the circuit will be retained in this condition until another triggering input is received. The presence of capacitor 24′ provides positive feedback action such that as the input at terminal 12′ starts to exceed the predetermined switching level for the gate 10′, the output at terminal 16′ starts positive, with this positive increase at terminal 16′ being coupled back to the input via capacitor 24′. This action is cumulative with fast switching resulting. The output pulse produced by the monostable multivibrator thus starts with an input triggering signal and ends when capacitor 24′ is charged substantially to the clamp voltage.

The current source comprising resistors 73 and 74, with resistor 73 being connected to the relatively high voltage, results in relatively linear charging of capacitor 24′ during the output pulse produced by monostable multivibrator in response to the input triggering signal. Thus, the output pulse wave may be accurately determined, with resistor 73 being suitably variable for varying the time constant of the circuit and therefore the length of the output pulse. The circuit comprising resistors 73 and 74 may be replaced by an active current source or by a single resistor if so desired. In the case of such resistor, as in the case of resistors 73 and 74, the total resistance thereof is desirably fairly high. Likewise, the voltage connected thereto is desirably fairly high in value to provide current source operation.

While I have shown and described several embodiments of my invention, it will be apparent to those skilled in the art that many changes and modifications may be made without departing from my invention in its broader aspects.

I claim:

1. An astable multivibrator comprising:

a semiconductor integrated circuit "or-nor" gate, said "or-nor" gate comprising a single stage, emitter-coupled-logic gate circuit including a pair of transistor means for respectively producing "or" and "nor" outputs, wherein the emitters of said transistor means are coupled together, said gate providing a non-inverted "or" output in response to an input applied to one input terminal of said gate, feedback means coupled between the non-inverted "or" output of said gate and the input terminal of the same gate, said feedback means including a timing capacitor serially coupled between said "or" output and said one input terminal, and a charging means for said capacitor coupled between the "nor" output of said gate and said one input terminal.

2. The apparatus according to claim 1 wherein said charging means for said capacitor comprises a resistance coupling the "nor" output of said gate to said one input terminal.

3. The apparatus according to claim 1 further including a disabling-enabling circuit for said apparatus comprising a second semiconductor integrated circuit gate for receiving a disabling-enabling input and for producing an output in response thereto, and means coupling the output of said second gate to the "nor" output of the first mentioned gage for selectively maintaining said "nor" output of said first mentioned gate at a predetermined voltage level, as well as for selectively releasing said "nor" output of said first mentioned gate for normal astable multivibrator operation.

4. The apparatus according to claim 3 wherein said means coupling an output of said second gate to the "nor" output of the first mentioned gate comprises a voltage divider disposed between positive and negative voltage points and having a first tap coupled to the said output of said second gate, and diode means coupling the "nor" output of the first mentioned gate to a more positive voltage tap on said voltage divider, said diode having its anode coupled to the last mentioned tap.

5. The circuit according to claim 3 wherein said predetermined voltage level is higher than the highest level normally provided at said "nor" output in the absence of said second gate by the highest voltage normally present across said timing capacitor.

6. The apparatus according to claim 3 wherein both said gates are provided as portions of the same semiconductor integrated circuit structure.

7. The multivibrator according to claim 1 wherein said "or-nor" gate includes a second input terminal, said second input terminal being connected to a bias voltage point.

8. An astable multivibrator circuit comprising:

a gate circuit having input means and characterized by first and second states determined according to whether an input applied at said input means exceeds a predetermined input level, said gate producing inverted and non-inverted outputs, said inverted output residing above said input level in one state of said gate circuit and residing below said input level in the other state of said gate circuit, said gate circuit comprising a transistor stage utilizing emitter-coupled logic, said stage including a pair of transistors having their emitter terminals interconnected, and means coupling the collector of one of said transistors to provide the inverted output of said gate circuit as well as means coupling the collector of the second of said transistors to provide the non-inverted output of said gate circuit, a timing capacitor coupling said non-inverted output to said input means, and a resistance coupling said inverted output to said input means, said resistance providing charging means for said capacitor.

9. The apparatus according to claim 8 wherein said means coupling the output of said one of said transistors to provide said inverted output comprises a first emitter-follower transistor and wherein the means coupling the collector of the second of said transistors to provide said non-inverted output comprises a second emitter-follower transistor, said input means comprising the base terminal of one of said pair of transistors.

10. The apparatus according to claim 8 wherein said transistors forming said gate circuit are provided within a common semiconductor integrated circuit structure.

11. An astable multivibrator circuit comprising:

a gate circuit having input means and characterized by first and second states determined according to whether an input applied at said input means exceeds a predetermined input level, said gate producing inverted and non-inverted outputs, said inverted output residing above said input level in one state of said gate circuit and residing below said input level in the other state of said gate circuit, a timing capacitor coupling said non-inverted output to said input means, a resistance coupling said inverted output to said input means, said resistance providing charging means for said capacitor, and a disabling-enabling circuit comprising a second gate circuit for receiving a disabling-enabling input and for producing an output in response thereto, and means coupling the output of said second gate circuit to the inverted output of the first mentioned gate circuit for selectively maintaining said inverted output of said first mentioned gate circuit at a predetermined voltage level, as well as for selectively releasing said inverted output of said first mentioned gate circuit for normal astable multivibrator operation.

12. The apparatus according to claim 4 wherein said means coupling an output of said second gate circuit to the inverted output of the first mentioned gate comprises a voltage divider disposed between positive and negative voltage points and having a first tap coupled to the said output of said second gate circuit, and diode means coupling the inverted output of the first mentioned gate circuit to a more positive voltage tap on said voltage divider, said diode means having an anode coupled to the last mentioned tap.

13. The circuit according to claim 4 wherein said predetermined voltage level is higher than the highest level normally provided at said inverted output in the absence of said second gate circuit by the highest voltage normally present across said timing capacitor.

* * * * *

UNITED STATES PATENT OFFICE
CERTIFICATE OF CORRECTION

Patent No. 3,680,003 Dated July 25, 1972

Inventor(s) MAURICE MARK WALKER

It is certified that error appears in the above-identified patent and that said Letters Patent are hereby corrected as shown below:

Col. 3, line 38, after "level" insert --well--

Col. 3, line 41, after "employed" delete "to".

Col. 6, line 44, change "72" to --73--

Col. 6, line 53, after "88." delete "clamp".

Col. 7, line 66 (claim 3, line 6), "gage" should be --gate--

Signed and sealed this 9th day of January 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE : 1969 O—366-334